No. 890,074. PATENTED JUNE 9, 1908
S. P. LERCH.
RAKE.
APPLICATION FILED SEPT. 3, 1907.
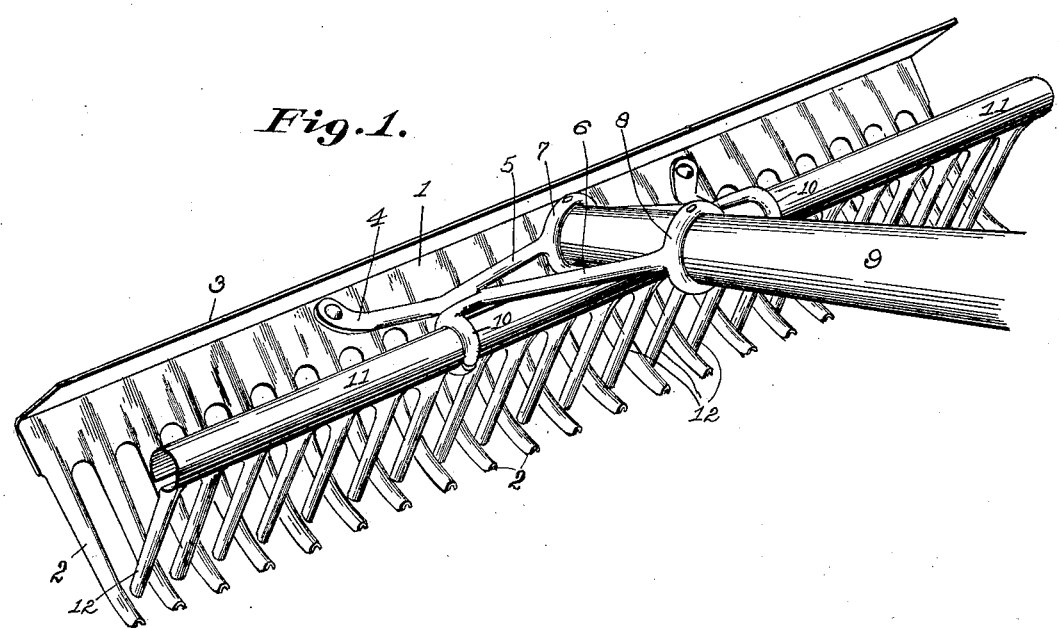
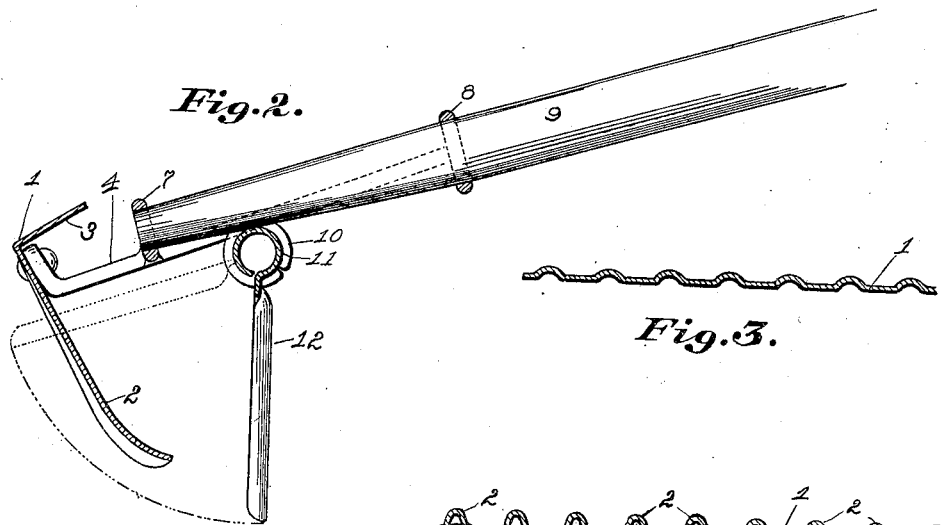
Witnesses
Harry A. Rastetter
Sylvia Boron
Inventor
Samuel P. Lerch
By F. W. Bond
Attorney

UNITED STATES PATENT OFFICE.

SAMUEL P. LERCH, OF CANTON, OHIO.

RAKE.

No. 890,074.  Specification of Letters Patent.  Patented June 9, 1908.

Application filed September 3, 1907. Serial No. 391,192.

*To all whom it may concern:*

Be it known that I, SAMUEL P. LERCH, a citizen of the United States, residing at Canton, in the county of Stark and State of Ohio, have invented certain new and useful Improvements in Rakes; and I do hereby declare that the following is a full, clear, and exact description of the same, reference being had to the accompanying drawing, making a part of this specification, and to the numerals and figures of reference marked thereon, in which—

Figure 1 is a perspective view. Fig. 2 is a transverse section of the rake head and one of the rake teeth, showing the handle in proper position and showing a transverse section of the rock tube. Fig. 3 is a transverse section through a portion of the corrugated head. Fig. 4 is a transverse section of the rake teeth looking toward the rake head.

The present invention has relation to lawn rakes and it consists in the novel construction hereinafter described and particularly pointed out in the claim.

Similar numerals of reference indicate corresponding parts in all the figures of the drawing.

In the accompanying drawing, 1 represents the rake head, which is formed of sheet metal from which head extend the integral teeth 2. The head 1 is corrugated as illustrated in Fig. 3. The corrugations being extended through the head from the teeth, said teeth being convexo-concave and are so formed for the purpose of giving strength to the teeth.

For the purpose of giving additional rigidity to the head 1 its top or upper edge is provided with the flange 3, which flange is extended the entire length of the head. To the head 1 is attached the bracket 4 which bracket consists of the members 5 and 6, said members being provided with the eyes 7 and 8 through which eyes the handle 9 passes, and is attached thereby securely connecting the handle to the head. The bracket member 6 is provided with the eyes 10, which eyes carry the rock tube 11. To which rock tube are attached or formed integral therewith the teeth 12, which teeth are so located that when they are brought into the position illustrated in dotted lines Fig. 2 they will come between the teeth 2.

It will be understood that the head can be stamped or bent into the form shown the same being true of the rock tube 11 and its teeth 12. The teeth 12 are for the purpose of automatically removing the material gathered by the teeth 2 when the rake proper is lifted from the ground. The teeth will drop or swing by gravity into the position illustrated in Fig. 2 when free. It will be understood that when the rake is moved along the ground the teeth 12 will swing backward thereby exposing the front ends of the teeth 2 and upon which teeth grass or other material is gathered.

It will be understood that by my peculiar manner of forming the rake head and the teeth that the entire rake except the bracket and handle can be formed of sheet metal, thereby reducing the cost of production and at the same time providing a rake that is light and easily operated.

Having fully described my invention what I claim as new and desire to secure by Letters Patent, is:—

As an improved article of manufacture, a rake consisting of a corrugated rake head provided with a lateral integral flange, and convexo-concave rake teeth extended from the corrugations in the rake head, substantially as and for the purpose specified.

In testimony that I claim the above, I have hereunto subscribed my name in the presence of two witnesses.

SAMUEL P. LERCH.

Witnesses:
J. A. JEFFERS,
F. W. BOND.